T. J. PAPY & P. DRUM.
FLAG POLE AND CONTAINER.
APPLICATION FILED APR. 2, 1918.
1,280,078.
Patented Sept. 24, 1918.
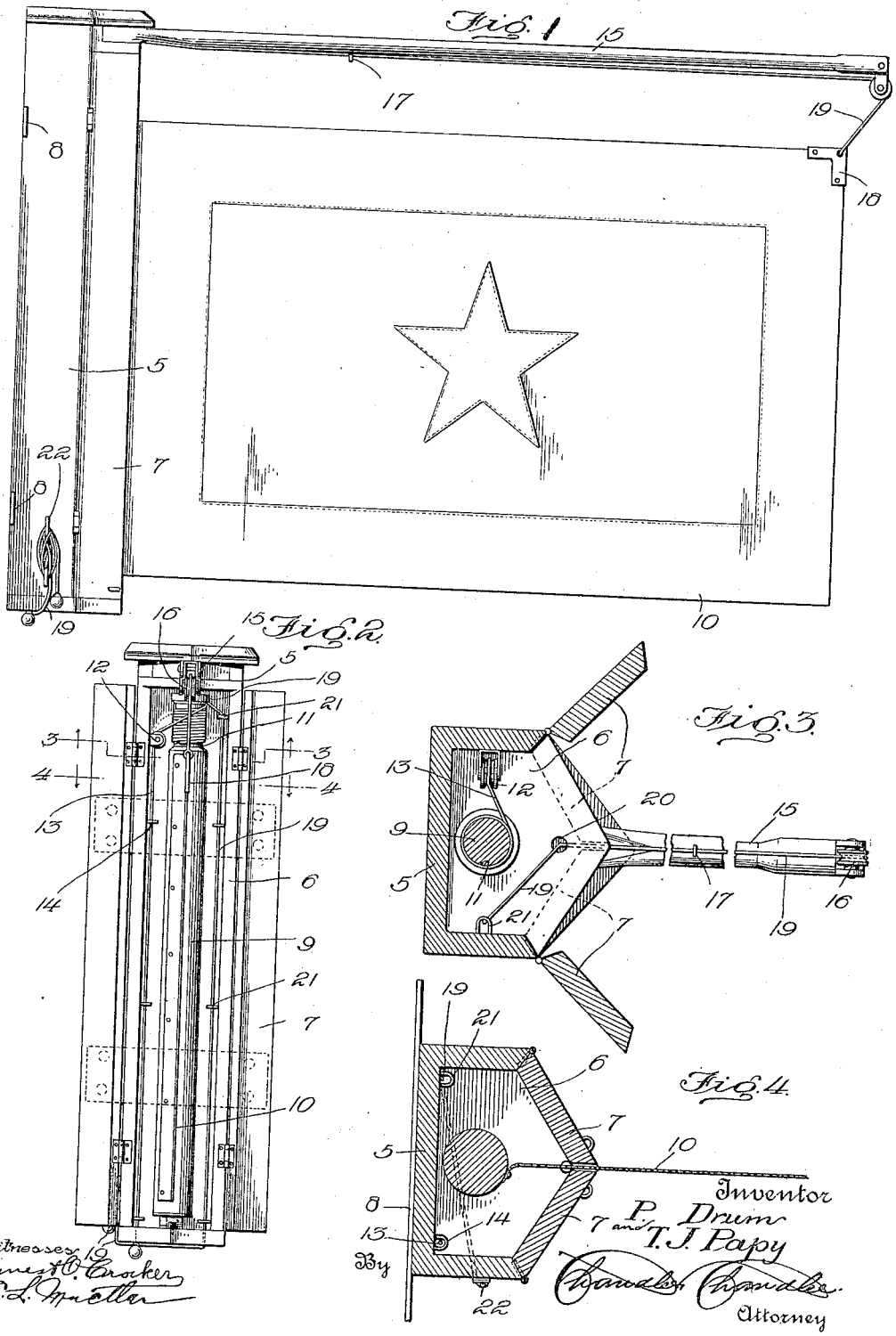

UNITED STATES PATENT OFFICE.

THOMAS J. PAPY AND PHILIP DRUM, OF PHILADELPHIA, PENNSYLVANIA.

FLAG POLE AND CONTAINER.

1,280,078.  Specification of Letters Patent.  Patented Sept. 24, 1918.

Application filed April 2, 1918. Serial No. 226,302.

*To all whom it may concern:*

Be it known that we, THOMAS J. PAPY and PHILIP DRUM, citizens of the United States, residing at Philadelphia, in the county of Philadelphia, State of Pennsylvania, have invented certain new and useful Improvements in Flag Poles and Containers; and we do hereby declare the following to be a full, clear, and exact description of the invention, such as will enable others skilled in the art to which it appertains to make and use the same.

This invention is an improvement in display devices and has particular reference to a flag pole and container.

An object of the invention is to provide an improved flag pole and container constructed to permit of a rapid furling and unfurling of a flag without raising and lowering the same as usual.

Another object is to provide for the housing of the flag when furled and a continued maintenance thereof in an extended position when unfurled.

A further object is the provision of a device of this character which is simple in construction, easy to manufacture and effective in carrying out the purposes for which it is designed.

The inventive idea involved is capable of receiving a variety of mechanical expressions one of which, for the purpose of illustrating the invention, is shown in the accompanying drawing wherein:—

Figure 1 is a side elevation of the device constructed in accordance with the invention.

Fig. 2 is a front elevation thereof.

Fig. 3 is a horizontal section on the line 3—3 of Fig. 2 with the closures for the housing in opened position.

Fig. 4 is a similar section on the line 4—4 of Fig. 2.

The device embodied in the present invention is particularly designed for displaying flags or other emblems from windows but it is to be understood that the same may be attached to an ordinary flag pole as well. The accompanying drawing illustrates what is now belived to be a preferred form of the invention which comprises a housing 5 of elongated and substantially rectangular formation having an open front 6 adapted to be closed by the hinged doors or closures 7 and also having the brackets 8 secured to the rear thereof for the purpose of attaching the housing to a suitable support.

Journaled longitudinally of the housing interiorly thereof and having bearings in the upper and lower ends is a drum or shaft 9 to which is secured the inner end of a flag or other emblem 10 and upon which said flag is adapted to be wound when in its furled position so that the same will be entirely inclosed within the housing and thus be protected against the weather. The upper end of the drum 9 is reduced and grooved as indicated at 11 and adjacent said upper end one side of the housing has secured thereto a pulley 12 around which is passed a furling cord 13 or other flexible element one end of which is secured to the upper end of the drum 9 in such manner that the cord will be wound upon said end when the flag is in its extended or unfurled position. The cord 13 is extended downwardly from the pulley 12 and passed through a plurality of guide loops or eyes 14 and also through the bottom of the housing where the same may be grasped and pulled to rotate the drum 9 in a direction to furl or wind the flag thereon.

A flag pole 15 has one end secured to the top of the housing 5 and is extended laterally therefrom and provided upon its outer end with a pulley 16 and intermediate its ends with a guide loop or eye 17. One of the outer corners of the flag 10 has secured thereto a small metallic clip or reinforcing element 18 to which is secured one end of an unfurling cord or other flexible element 19 which is extended from the flag to and around the pulley 16 and from thence longitudinally of the flag pole and through the eye or loop 17 therein. The cord is then passed through an opening 20 in the top of the housing and then extended through guide loops or eyes 21 arranged on the opposite side of the back of the housing from the eyes or loops 14 and from thence the cord 19 is extended through the bottom of the housing in the same manner as the cord 13, the portion of the cord 19 below the bottom of the housing being adapted to be pulled in order to unfurl or unwind the flag 10 from the drum 9. A cleat 22 is secured to the exterior of one side of the housing adjacent the bottom thereof so that the portions of the cords 13 and 14 extending below the housing may be wound thereon when the flag is in its furled or unfurled positions.

It will be apparent from the foregoing description taken in connection with the accompanying drawing that when the flag is wound or furled upon the drum 9 a pull upon the cord 19 will draw the free end of the flag outwardly toward its extended position and when in such position it will be obvious that the same will be maintained thus regardless of whether or not a wind is blowing and that the possibility of the flag becoming wound about its pole or entangled with the rope or cords will thus be obviated. At the same time that the flag is being unfurled, the cord 13 will be wound upon the upper end of the drum 9 so that when it is desired to furl the flag a pull upon said cord will impart rotation to the drum in the proper direction to wind the flag thereon.

What is claimed is:—

1. A device of the class described comprising a housing, a flag pole extending therefrom, and means operable within the housing and around which a flag is adapted to be furled.

2. A device of the class described comprising a housing, a flag pole extending therefrom, a rotatable element operable within the housing and around which a flag is adapted to be furled, means connected to said rotatable element for operating the same to furl the flag thereon, and means connected to the flag and to said flag pole for unfurling the flag from said rotatable element.

3. A device of the class described comprising a housing, a flag pole extending therefrom, a rotatable element operable within said housing and around which a flag is adapted to be furled, a flexible furling element connected to said rotatable element for operating the same to furl the flag thereon and adapted to be wound upon said rotatable element when the flag is unfurled, and an unfurling flexible element connected to the flag and flag pole and operable to extend the flag from the housing to its unfurled position and wind the furling element upon said rotatable element.

4. A device of the class described comprising a housing having an open front, hinged closures for said open front, a drum rotatable in opposite directions in said housing and extending longitudinally thereof and upon which a flag is adapted to be wound when the drum is rotated in one direction, a flexible element having one end secured to said drum and a portion extending longitudinally of and through one end of said housing and adapted to be pulled to wind or furl the flag above the drum, a flag pole extending laterally from one end of the housing and carrying a pulley at its outer end, a second flexible element having one end secured to said flag and extended therefrom and around the pulley on said flag pole and thence longitudinally of the pole and through the adjacent end of the housing, said flexible element also having a portion extending longitudinally thereof and through the opposite end of the housing and adapted to be pulled to unfurl the flag from the drum and rotate the latter in an opposite direction to wind the first named flexible element thereupon.

In testimony whereof, we affix our signatures in the presence of two witnesses.

THOMAS J. PAPY.
PHILIP DRUM.

Witnesses:
S. A. WALTON,
R. J. HAAS.

Copies of this patent may be obtained for five cents each, by addressing the "Commissioner of Patents, Washington, D. C."